March 26, 1968 G. S. ROSENTHAL 3,374,788

CONTRACEPTIVE DEVICES AND METHODS

Filed Oct. 24, 1965

9 Sheets-Sheet 1

INVENTOR
GERALD S. ROSENTHAL
BY Alfred W. Petchaft
ATTORNEY

INVENTOR
GERALD S. ROSENTHAL
BY
Alfred W. Petchaft
ATTORNEY

March 26, 1968 G. S. ROSENTHAL 3,374,788

CONTRACEPTIVE DEVICES AND METHODS

Filed Oct. 24, 1965 9 Sheets-Sheet 4

INVENTOR
GERALD S. ROSENTHAL
BY
Alfred W. Petchaft
ATTORNEY

INVENTOR
GERALD S. ROSENTHAL
BY
Alfred W. Petchaft
ATTORNEY

INVENTOR
GERALD S. ROSENTHAL
BY
Alfred W. Petchaft
ATTORNEY

March 26, 1968 G. S. ROSENTHAL 3,374,788
CONTRACEPTIVE DEVICES AND METHODS
Filed Oct. 24, 1965 9 Sheets-Sheet 6

INVENTOR
GERALD S. ROSENTHAL
BY [signature]
ATTORNEY

March 26, 1968 G. S. ROSENTHAL 3,374,788

CONTRACEPTIVE DEVICES AND METHODS

Filed Oct. 24, 1965

9 Sheets-Sheet 7

INVENTOR
GERALD S. ROSENTHAL

BY [signature]

ATTORNEY

March 26, 1968 G. S. ROSENTHAL 3,374,788

CONTRACEPTIVE DEVICES AND METHODS

Filed Oct. 24, 1965 9 Sheets-Sheet 8

INVENTOR
GERALD S. ROSENTHAL
BY [signature]
ATTORNEY

INVENTOR
GERALD S. ROSENTHAL
BY John D. Rose III
ATTORNEY

United States Patent Office 3,374,788
Patented Mar. 26, 1968

3,374,788
CONTRACEPTIVE DEVICES AND METHODS
Gerald S. Rosenthal, Ogden, Utah, assignor to Deseret Pharmaceutical Company, Salt Lake City, Utah, a corporation of Utah
Continuation-in-part of application Ser. No. 461,281, June 4, 1965. This application Oct. 24, 1965, Ser. No. 515,284
22 Claims. (Cl. 128—130)

This invention relates in general to certain new and useful improvements in intra-uterine contraceptive devices and means for installing the same. This application is a continuation-in-part of my co-pending application Ser. No. 461,281, filed June 4, 1965, now abandoned.

It has been known for many years that the presence of mechanical inserts in the uterus will prevent conception. Perhaps the earliest formal research in this direction was carried out by a German gynecologist, Dr. Ernst Grafenberg, who employed a uterine ring made of silver wire. This device did produce statistically satisfactory results in preventing conception, but being silver reacted with acidic discharges in the vaginal tract and was thought to produce pelvic inflammation. In the intervening years gynecologists and others interested in planned parenthood have from time to time experimented with intra-uterine inserts of various types but numerous difficulties have been encountered.

Most substances from which such devices can be fabricated are not readily tolerated by body-tissue and induce uterine contractions which are of sufficient force to cause expulsion. In a substantial number of cases this expulsion goes unnoticed and an unwanted pregnancy results. Moreover, intra-uterine inserts must be introduced into the cavum uteri through the canalis cervicis uteri or so-called cervical canal, and this is a pseudo-surgical procedure which requires sterile precautions as well as a considerable technique on the part of the gynecologist.

It is, therefore, the primary object of the present invention to provide an intra-uterine insert which is made of non-toxic material and will not normally produce cervical or uterine inflammation or involuntary rejection.

It is another object of the present invention to provide an intra-uterine insert which can be easily inserted into the uterus with a minimum of discomfort to the patient.

It is also an object of the present invention to provide an intra-uterine insert which is pre-sterilized and can be introduced into the uterus with ease and simplicity.

It is another object of the present invention to provide an intra-uterine insert which is of unique mechanical design and will not be unauthorizedly expelled from the uterus.

It is similarly an object of the present invention to provide an intra-uterine insertion unit in which the insert is compactly contained within an insertion tube during the initial stage of insertion and upon being pushed into the uterus from the insertion tube will assume a self-retaining position within the uterus so as to preclude involuntary rejection or accidental expulsion.

It is an additional object of the present invention to provide an intra-uterine insert which can be readily inspected from time to time by the patient herself to insure proper contained presence in the uterus but nevertheless will not interfere with normal vaginal functions.

It is a still further object of the present invention to provide an intra-uterine contraceptive device which will not chafe or irritate the cervical canal during placement.

Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a top plan view of a combined intra-uterine insert and insertion means constructed in accordance with and embodying the present invention;

FIGS. 2 and 3 are enlarged fragmentary sectional views taken along lines 2—2 and 3—3, respectively, of FIG. 1;

FIGS. 4, 5, 6, and 7, are transverse sectional views taken along lines 4—4, 5—5, 6—6, and 7—7, respectively, of FIG. 2;

Figure 31:
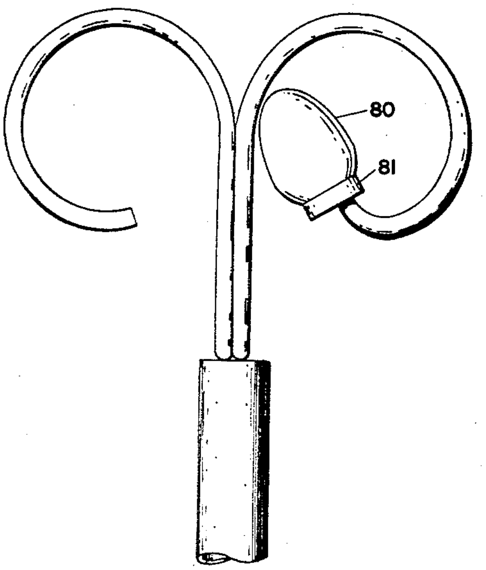
Figure 32:
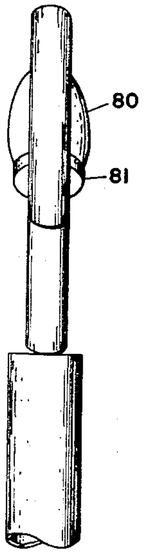
Figures 33, 34:
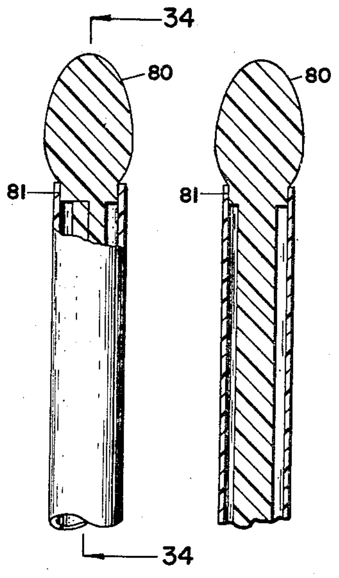
Figures 17, 30:
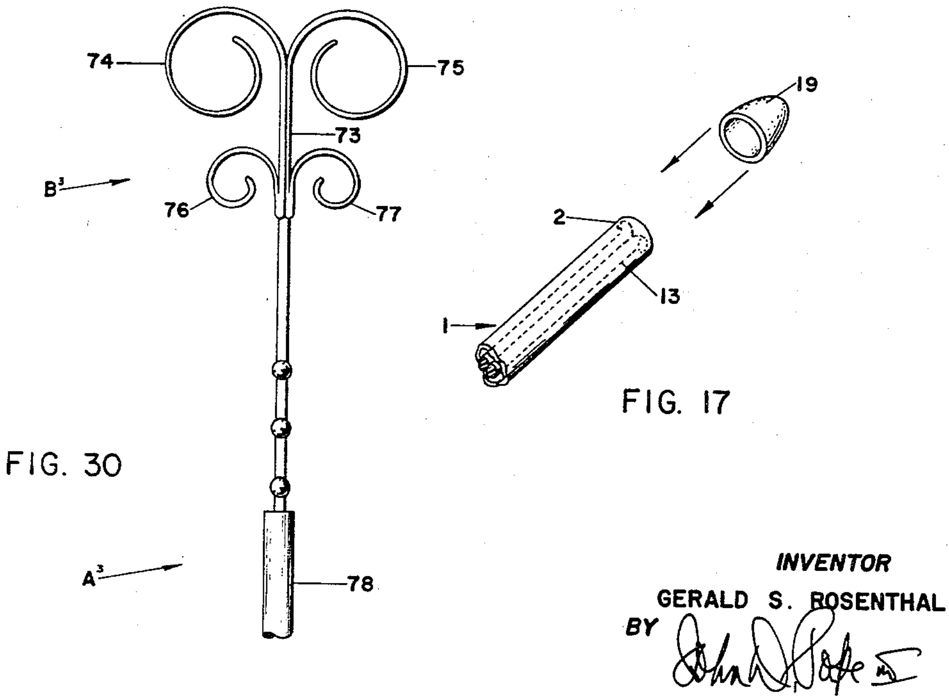
FIG. 17 is a fragmentary perspective view showing the distal end of an insertion tube and a gelatine cap forming part of the present invention.
Figure 18:
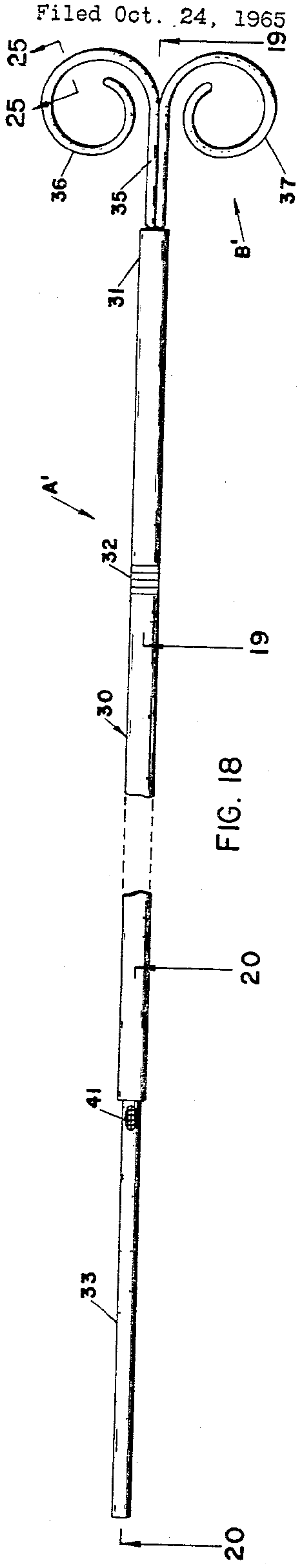
FIG. 18 is atop plan view of a modified intra-uterine device constructed in accordance with and embodying the present invention.
Figure 19:
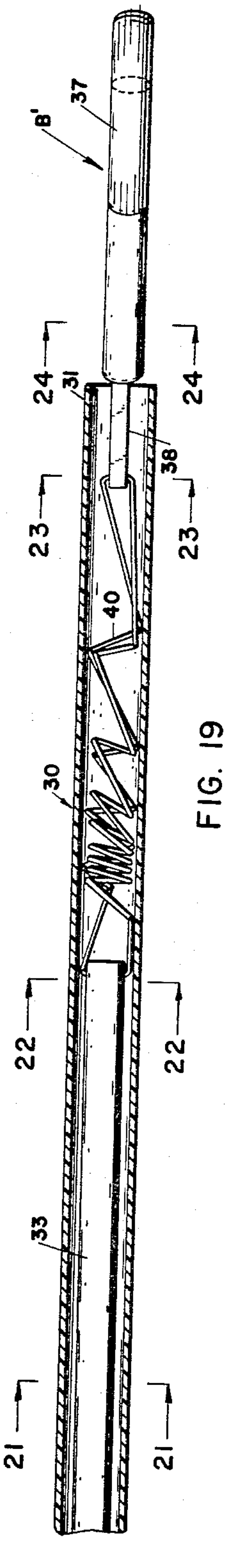
Figure 20:
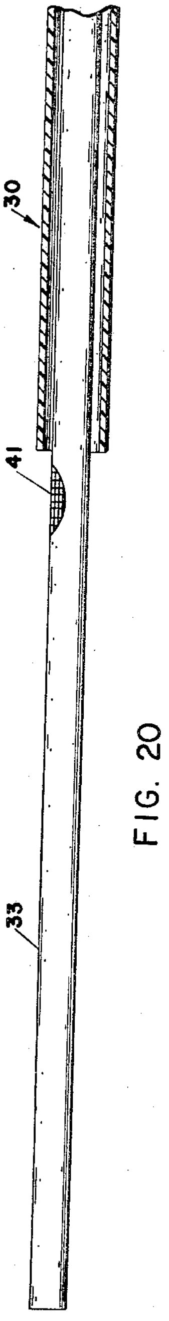
Figure 25:
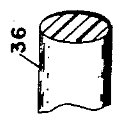
Figure 24:
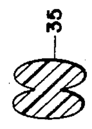
Figure 23:
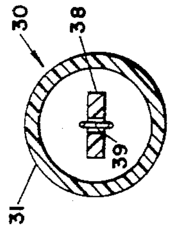
Figure 22:
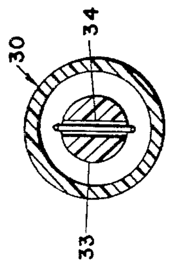
Figure 21:
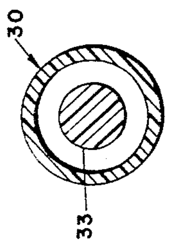
Figure 26:
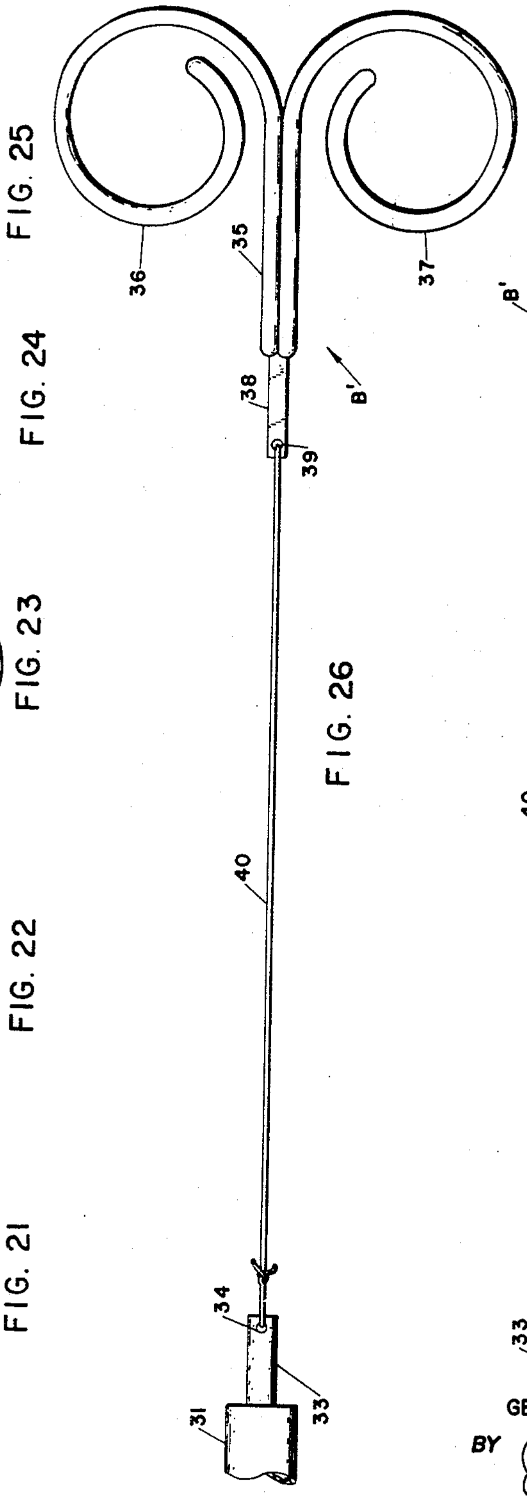
Figure 27:
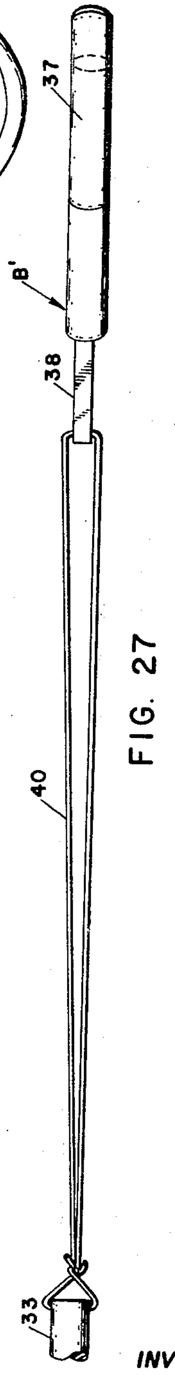
Figure 28:
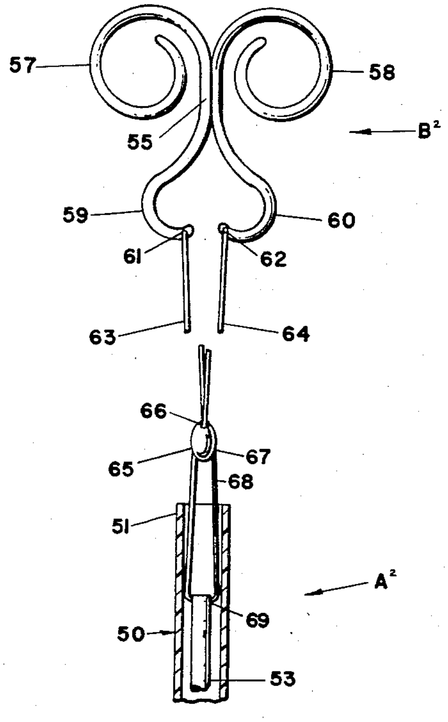
Figure 29:
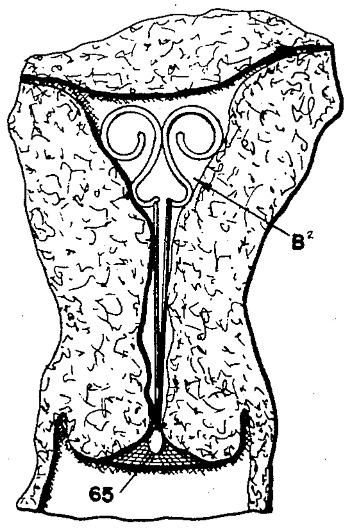

FIGS. 19 and 20 are enlarged fragmentary sectional views taken along lines 19—19 and 20—20, respectively, of FIG. 18;

FIGS. 21, 22, 23, and 24 are transverse sectional views taken along lines 21—21, 22—22, 23—23, and 24—24, respectively, of FIG. 19;

FIG. 25 is a fragmentary transverse sectional view taken along line 25—25 of FIG. 18;

FIGS. 26 and 27 are enlarged plan and elevational views, respectively, of the insert forming part of the modified intra-uterine device illustrated in FIG. 18;

FIG. 28 is a fragmentary plan view, partially in section, showing another modified intra-uterine device constructed in accordance with and embodying the present invention;

FIG. 29 is a diagrammatic frontal view of the female pelvic region showing the intra-uterine insert illustrated in FIG. 28 emplaced within the uterus;

FIG. 30 is a fragmentary top plan view of a further modified form of intra-uterine device constructed in accordance with and embodying the present invention;

FIGS. 31 and 32 are top plan and side elevational views, respectively, of an intra-uterine device forming part of the present invention, the insert thereof being provided with a gently contoured head;

FIG. 33 is a side elevational view, partially broken away and in section, of the intra-uterine device illustrated in FIG. 31 and showing the insert thereof drawn into the insertion tube; and FIG. 34 is a fragmentary sectional view taken along line 34—34 of FIG. 33.

Corresponding reference characters indicate corresponding parts throughout the several views of the drawings.

Referring now in more detail and by reference characters to the drawings, which illustrate practical embodiments of the present invention, A designates an intra-uterine device comprising an elongated insertion tube 1 formed preferably of polyethylene or a similar biologically inert synthetic resin which is of sufficient overall thickness and polymeric density so as to be resiliently flexible so that it will readily bend in conformity with the contours of the vagina and cervical canal, but is nevertheless sufficiently rigid so that it can be inserted into the cervical canal and will not collapse under the contractile muscular pressure of the walls thereof. The overall dimensions of the insertion tube 1 are not critical but it has been found as a matter of practical experience that the insertion tube 1 should preferably have a length of approximately ten to fourteen inches, an outside diameter of approximately three-eighths of an inch and a wall thickness of approximately eighty mils. Inwardly from its distal tip 2, the insertion tube 1 is provided externally with a red annular indicator-band 3. Actually, this indicator-band 3 may be of any desired color but, on the basis of practical experience, it has been found that red is readily visible and serves very well to afford the physician or gynecologist some means of determining the distance to which the distal tip 2 has been inserted into the cervical canal, as will be presently more fully discussed. In this connection, it should also be noted that the indicator-band 3 is located approximately six centimeters or two and one-half inches from the distal tip 2 of the insertion tube which is considered to be the normal internal length between the external cervical os and the fundus of the uterus for the average human female. Loosely and slidably disposed within the insertion tube 1 and extending for a substantial distance axially outwardly from the proximal end 4 thereof is an inserter-rod 5 having a distal end 6 and a proximal end 7. The inserter-rod 5 is preferably of circular cross-sectional shape and is formed of semi-rigid somewhat flexible polyethylene or other suitable material.

As a matter of fact, the insertion tube 1 and the inserter-rod 5 do not remain within the body of the patient and therefore the material used in fabricating them is not particularly critical provided it has the necessary combination of rigidity and flexibility to perform its mechanical function.

Figure 1:
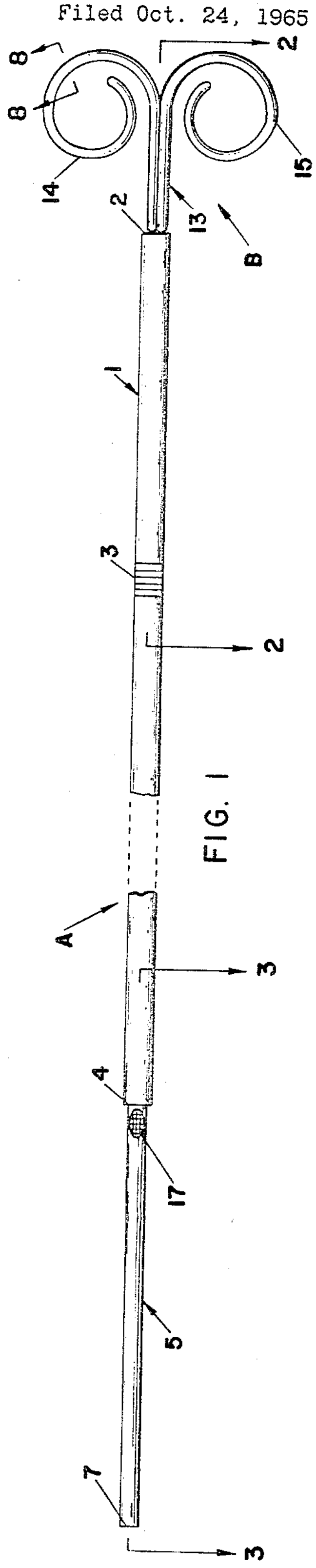
Figure 2:
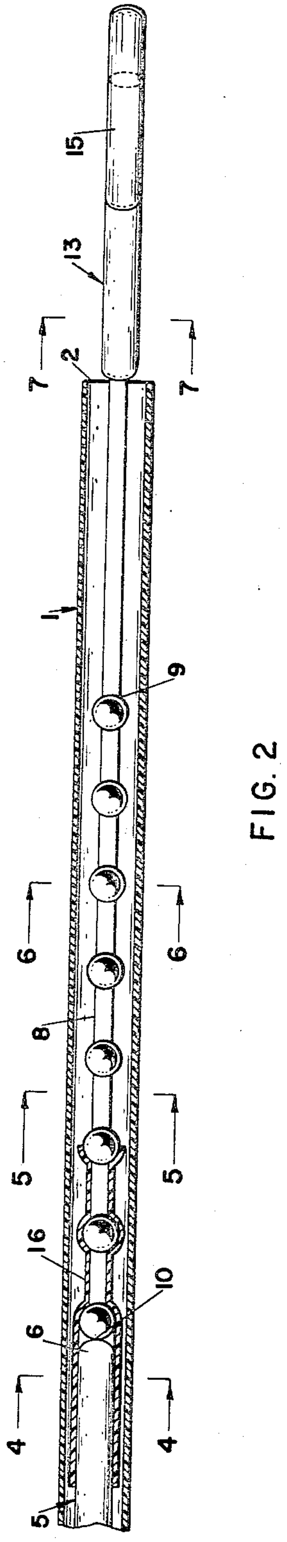
Figure 3:
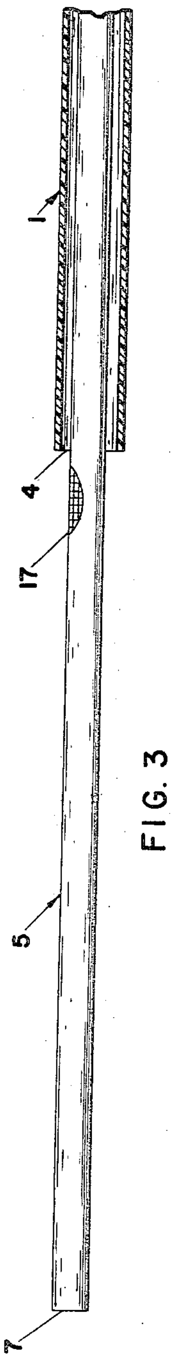
Figures 4, 5, 6, 7, 8, 9, 10:
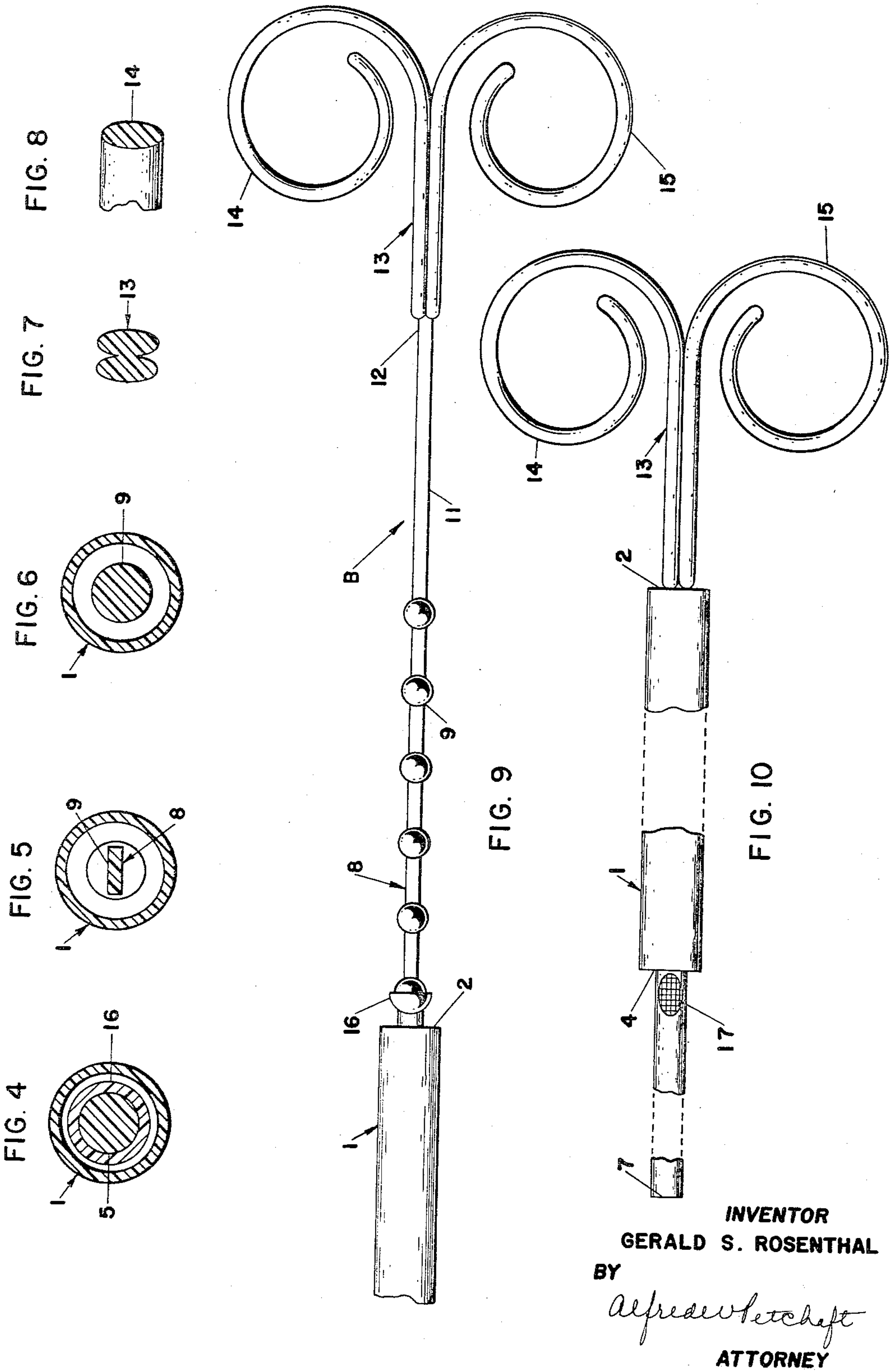
FIG. 8 is a fragmentary transverse sectional view taken along line 8—8 of FIG. 1.
FIG. 9 is an enlarged fragmentary plan view of the insert connected to the inserter rod.
FIG. 10 is an enlarged fragmentary plan view of the combined insert and insertion means with the insert partially projected therefrom preparatory to enclosure in a sterile outer envelope.
Figure 13:
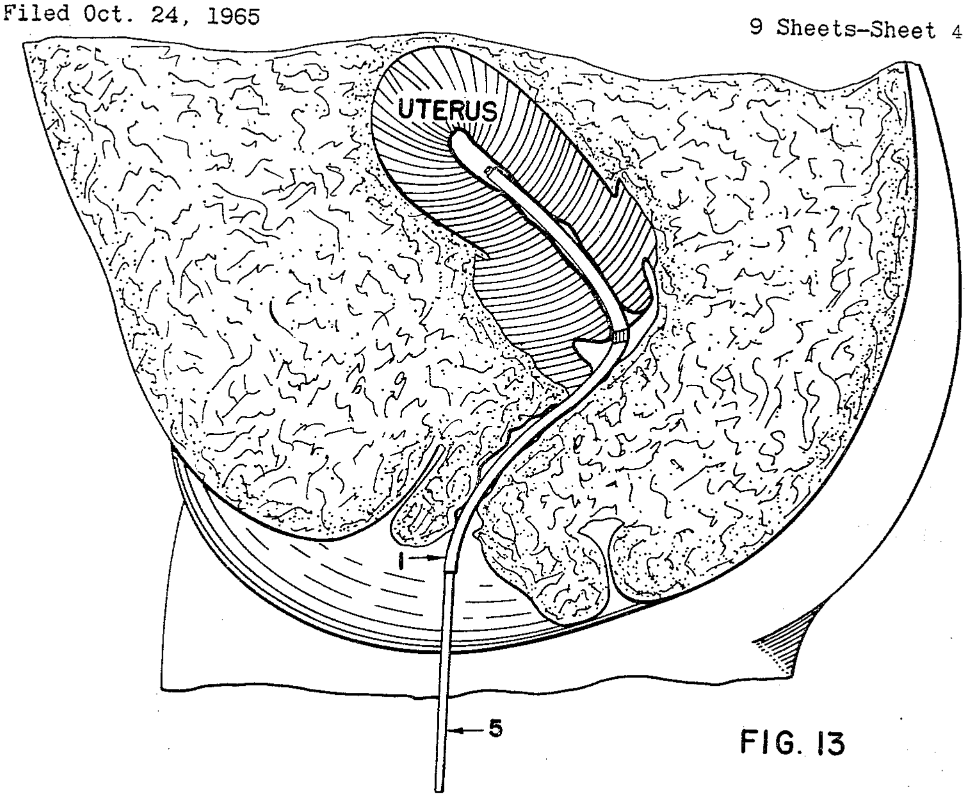
FIG. 13 is a diagrammatic transverse view of the female pelvic region, illustrating the first stage of installing the intra-uterine insert of the present invention.
Figure 14:
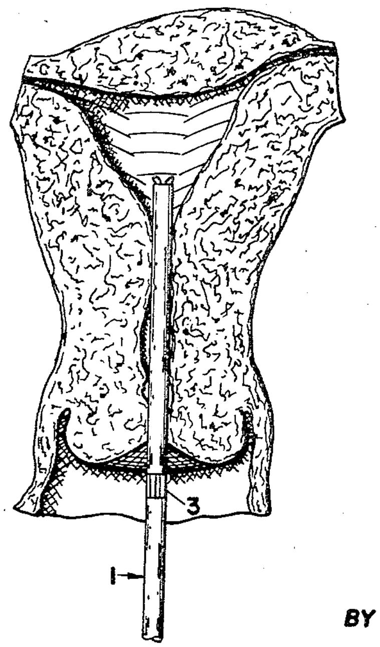
FIG. 14 is a diagrammatic frontal view of the female pelvic region showing the second stage of installing said intra-uterine insert.
Figure 11:
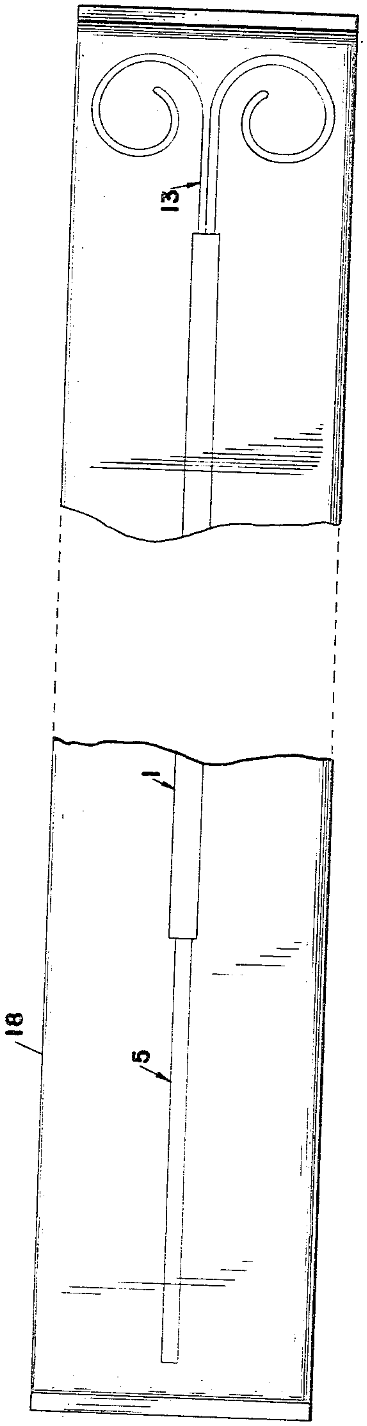
FIG. 11 is a plan view of the entire sterilized unit prior to use by the physician.

Provided for cooperation with the insertion tube 1 and inserter-rod 5 is an intra-uterine insert B molded or otherwise suitably formed from high-molecular weight polyethylene or other similar biologically inert synthetic resin, which is substantially rigid but is nevertheless resiliently flexible and can be deformed under moderate manually applied force but will nevertheless resume its initial shape when released. The intra-uterine insert B integrally includes a relatively flexible tail-portion 8 of ribbon-like or rectangular cross-sectional shape having a plurality of spherical beads or knob-like protuberances 9 integrally formed at uniformly spaced intervals therealong. As a result of observation and experimentation, it has been found preferable to employ eight such spherical beads 9 spaced by a center-to-center distance of five-sixteenths of an inch, with the first bead 9 being directly adjacent to the proximal end 10 of the tail-portion 8, the entire length of the tail-portion 8 being approximately three and three-fourths inches in length. Thus the tail-portion 8 will have a smooth uninterrupted section 11 at its distal end 12, all as best seen in FIG. 10. Formed integrally upon and extending axially outwardly from the distal end 12 of the tail-portion 8 is a retention-head 13 having an uninterrupted cross-sectional shape somewhat resembling a "figure eight" and separating at its outer end into two spirally curled terminal portions 14, 15, which are, in turn, of somewhat oval or elliptical cross-sectional shape, as best seen in FIG. 8.

Figure 12:
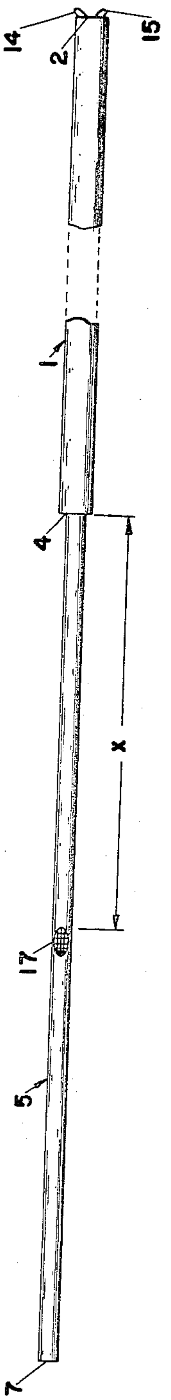
FIG. 12 is an enlarged fragmentary sectional view showing the insert withdrawn into the insertion device preparatory to implantation within the uterus.
Figure 15:
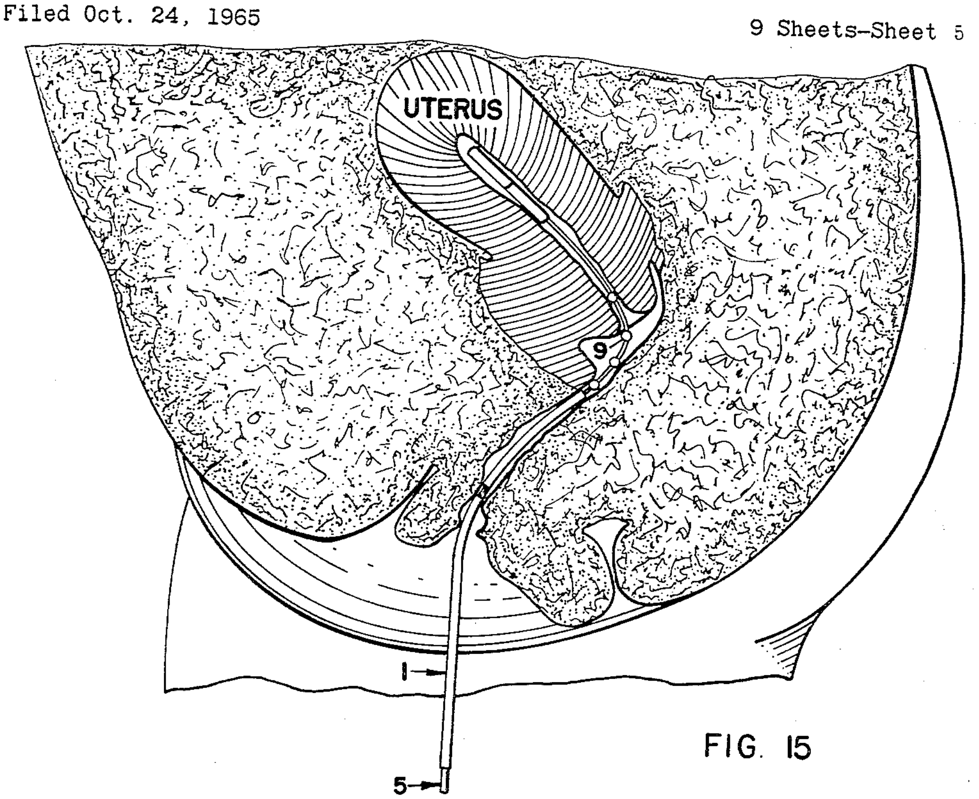
FIG. 15 is a diagrammatic transverse view of the female pelvic region showing the third stage of installing said intra-uterine insert.
Figure 16:
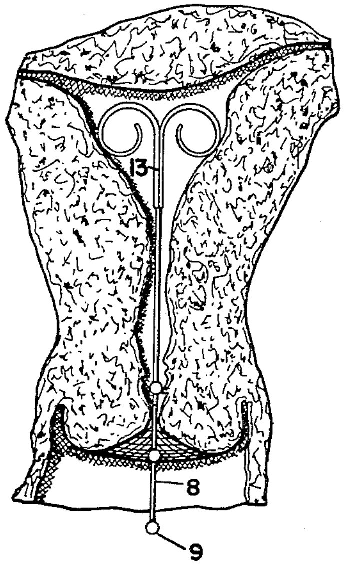
FIG. 16 is a diagrammatic frontal view of the female pelvic region showing the final stage of installing said intra-uterine insert.

The proximal end 10 of the tail-portion 8 is connected to the distal end 6 of the inserter-rod 5 by means of a tubular sleeve 16 formed preferably of heat-shrinkable synthetic resin. The sleeve 16 is initially slid, for a substantial distances at one of its ends, over the distal end 6 of the inserter-rod 5 and the proximal end 10 of the tail-portion 8 is, in turn, slid into the other end, the sleeve 16 being of sufficient length so as to extend for a substantial distance along the tail-portion 8 and embrace at least one of the spherical beads 9. The sleeve 16 is thereupon subjected to a moderate degree of elevated temperature sufficient to cause it to shrink tightly down around and embrace the adjacent ends of the tail-portion 8 and the inserter-rod 5, thereby holding them tightly and securely together. It will be evident to one skilled in the art that the tail-portion 8 and inserter-rod 5 can be joined in any suitable manner such as by a split metal sleeve or by fusing the two together through the application of heat. In the latter instance, the rod and tail-portion, of course, would have to be formed from compatible plastics. Finally, the inserter-rod 5 is provided approximately three and one-fourth inches from its proximal end 7 with a plainly visible black dot 17, this distance being substantially equal to the length of the entire retention-head 13 of the insert B when the latter is sheathed within the insertion tube 1, as indicated by the reference letter *x* in FIG. 12.

The proximal end 7 of the inserter-rod 5 is then slid into the distal end of the insertion tube 1 and pushed entirely through the length thereof until the connected end of the insert B is also pulled into the insertion tube 1 and the proximal end 7 of the inserter-rod 5 will project from the proximal end 4 of the insertion tube 1 with the black dot 17 visible. In this position the retention-head 13 will still be completely outside of the insertion tube 1 and the region of juncture between the tail-portion 8 and the retention-head 13 will be located approximately at the distal end 2 of the insertion tube 1, all as best seen in FIG. 10. In this relative position, the combined insertion tube 1, the inserter-rod 5 and insert B are enclosed within a flat rectangular envelope 18 preferably made of heat-sealable transparent synthetic resin sheathing. The envelope 18 is then heat-sealed and the entire unit sterilized in any suitable conventional manner. The sterilization can be performed in a number of different ways and can be carried out after packaging but these procedures do not constitute part of the present invention and therefore need not be specifically described in detail herein. It is sufficient for present purposes merely to point out that the intra-uterine device A and the interior of the envelope 18 are surgically sterile and the envelope 18 serves to preserve the intra-uterine device A in such sterile condition during subsequent storage and handling.

In order to implant or install the insert B within the uterus, the gynecologist or physician will ordinarily conduct a preliminary pelvic examination to determine whether or not there is any indication of pregnancy, carcinoma, acute cervicitis, acute or subacute adnexal disease, fibroid tumor or menorrhagia. It is also considered good clinical practice to obtain a Papanicolaou (Pap) smear on this occasion. Obviously no intra-uterine contraceptive procedures of any type should be pursued if any of the foregoing pathological conditions are suspected. Assuming that none of these contra-indications are encountered, the gynecologist or physician will ordinarily place the patient upon an examining table with the legs and knees in crutches or stirrups in the usual pelvic examination position and gently probe the cervical canal to determine if the uterus is anteverted or retroverted. A conventional Hank dilator of an appropriate size may be used for slightly dialating the cervix and aligning the cervical canal. In the case of a nulliparous patient is is desirable to use particular care in dilating the cervical canal, thereby avoiding any serious degree of discomfort to the patient inasmuch as the cervical canal of a nulliparous patient is usually rather small in diametral size. After one pregnancy, the cervical canal is usually much larger so that very little difficulty of this nature is encountered and with multiparous patients such difficulties are rarely ever encountered. Actually, even with nulliparous patients the problem of dilating the cervical canal and the discomfort attendant, if any, thereon has been found to be minor and transitory.

The intra-uterine device A is then removed from the sterile envelope 18 and the proximal or protruding end of the inserter-rod 5 is pulled slowly outwardly so that the retention-head 13 of the insert B is drawn into and sheathed within the distal end of the insertion tube 1. As this occurs the coiled convolutions of the terminal portions 14, 15, straighten out until, when fully sheathed, they assume the position shown in FIG. 12. Thereupon the distal tip 2 of the loaded insertion tube 1 is gently inserted into the cervical os and the insertion tube 1 is slowly but firmly advanced through the cervical canal and uterus until it contacts the fundus. At this point in the procedure, usually both the patient and the gynecologist will feel the pressure of contact with the fundus. As has been above mentioned, the red band 3 is approximately two and one-half inches or six centimeters from the distal tip 2 of the insertion tube 1, this length being assumed to be the average anatomical distance between the external cervical os and fundus. From this position, the insertion tube 1 is pulled back about one-half inch or one centimeter and the entire device A is rotated about its longitudinal axis until the black dot on the inserter-rod 5 is facing upward. This orients the insert B in the frontal plane of the uterus. Thereupon the inserter-rod 5 is advanced slowly and gently until the black dot on the inserter-rod 5 reaches the proximal end 7 of the insertion tube 1. Sometimes, in a patient with a very small uterus, pressure will be felt by the patient within the uterus before the black dot fully reaches the proximal end 7 of the insertion tube 1 and in such case the inward pushing movement will be terminated. Obviously, as the inserter-rod 5 is pushed inwardly the retention-head 13 of the insert B will be progressively unsheathed and the terminal portions 14, 15, will return to their original coiled shape or position for retentive lodgment within the cavum uteri.

Thereupon, the insertion tube 1 is gently withdrawn from the cervical canal while the inserter-rod 5 is held stationary. As this occurs the tail-portion 8 of the insert B will be unsheathed and left within the cervical canal. As has been above indicated, the tail-portion 8 is usually longer than the cervical canal and therefore the proximal end 10 thereof will now depend loosely and in exposed position within the interior chamber of the vagina below the cervix. The insertion tube 1 and the inserter-rod 5 are then manually shifted in a lateral direction so as to bring the downwardly protruding end of the tail-portion 8 somewhat to one side. A scissors or cutting forceps can then be inserted into the vagina and the downwardly protruding end of the tail-portion 8 can be severed or cut loose from the inserter-rod 5. Preferably all but one or two of the beads 9 protruding from the cervix should be clipped off and the cutting should preferably be done very close to the underside of the lowermost bead 9 which is left in place. By this means rough edges are avoided. As soon as the clipping or cutting operation has been completed, the insertion tube 1 and inserter-rod 5 can be entirely withdrawn and discarded.

It is possible to fit a gently contoured gelatin cap 19 over the distal end 2 of the insertion tube 1 once the retention-head 13 has been completely drawn into it, all as best seen in FIG. 17. The cap 19 prevents chafing of and irritation to the cervical canal as the insertion tube 1 is advanced therethrough and into the uterus. In fact, by fitting the cap 19 over the distal end 2, it is possible for the gynecologist to insert the tube 1 without previously dilating the cervical canal. The cap 19 is, of course, non-toxic and dissolves within the uterus in a matter of minutes allowing the gynecologist to perform subsequent procedures as hereinbefore described.

The patient should be instructed to examine herself from time to time to insure that the insert B remains in proper position. This is relatively easy to do because the patient will know how many of the beads 9 have been left protruding from the cervix and these can readily be counted by digital exploration. Inasmuch as the length of the tail-portion 8 which protrudes below the cervical os is very short, it should not produce any discomfort whatever or interfere in any way with coitus. It has been found, as a result of extensive clinical work, that the insert B can be allowed to remain within the uterus for periods of a year or more without discomfort, irritation or interference with the menstrual cycle. Some gynecologists have even expressed the opinion that the insert B can be allowed to remain within the uterus for many years, if desired, but it seems preferable to instruct the patient to return for periodic examinations at intervals of six months to a year, so that the insert B can be removed and replaced at the discretion of the physician.

As will be seen by reference to FIGS. 18 through 27, it is possible to provide a modified intra-uterine contraceptive device $A^1$ including an insertion tube 30 having a distal tip 31, the tube 30 being provided inwardly from its distal tip 31 at a distance of about two and one-half inches with an indicator band 32 which is similar to the indicator band 3 of intra-uterine device A. Slidably fitted within the tube 30 is a flexible inserter-rod 33 provided with a transversely extending hole 34 at its distal end.

Provided for cooperation with the insertion tube 30 and inserter-rod 33 is an intra-uterine insert $B^1$ integrally including a retention-head 35 which separates at one end into two spirally curled terminal portions 36, 37, and is otherwise similar to the retention-head 13 of intra-uterine insert B. Extending from the opposite end of the retention-head 35 is a relatively short tail-portion 38 of ribbon-like or rectangular cross-sectional shape, the tail-portion 38 being provided with an aperture 39. Interconnecting the inserter-rod 33 and the retention-head 35 is a nylon or other suitable biologically inert string 40 which is passed through the hole 34 of the inserter-rod 33 and the aperture 39 of the tail-portion 38 and is tied therebetween. Finally, the inserter-rod 33 is provided with a plainly visible black dot 41 which, when the retention-head 35 is completely drawn into the tube 30 and the distal end of the inserter-rod 33 is brought into endwise abutment with such retention-head, is located at a distance from the proximal end of the insertion tube 30 equal to the sheathed length of the insert $B^1$. The gynecologist, of course, can use the black dot 41 to determine when the retention-head 35 is fully unsheathed in the patient's uterus. In other words, when the black dot 41 reaches the proximal end of the insertion tube 30, the intra-uterine insert $B^1$ will be fully unsheathed within the patient's uterus.

Intra-uterine device $A^1$ is utilized for emplacing the intra-uterine insert $B^1$ within the patient's uterus in a manner similar to that described in conjunction with intra-uterine device A. However, after the insertion tube 30 is withdrawn, the string 40 instead of a beaded tail-portion is cut with a scissors or cutting forceps and removed leaving the intra-uterine insert $B^1$ emplaced within the patient's uterus. Of course, a gelatine cap 19 can be fitted over the distal end of the insertion tube 30 so that the insertion tube 30 can be passed through the cervical canal without any additional dilating other than that dilation which is caused by the tube 30 itself.

Referring now to FIGS. 28 and 29, it is possible to provide another modified form of intra-uterine contraceptive device $A^2$ including an insertion tube 50 having a distal tip 51 and an indicator band (not shown) affixed thereto at a distance inwardly from the distal tip 51 of approximately two and one-half inches. Slidably fitted within the tube 50 is an inserter-rod 53 having a black dot (not shown) which serves the same purpose as the black dot 41 of intra-uterine device $A^1$.

Provided for cooperation with the insertion tube 50 and inserter-rod 53 is an intra-uterine insert $B^2$ integrally including a retentionhead 55 which forwardly separates into two spirally curled terminal portions 57, 58. At its rear or opposite end, the retention-head 55 separates into two involutedly curved tail-portions 59, 60, having opposed closely presented ends which are respectively provided with apertures 61, 62. Fitted through the apertures 61, 62, and tied to the tail-portions 59, 60, are strings 63, 64, which are made from nylon or some other suitable biologically inert material. The strings 63, 64 are of equal length and are tied at their opposite ends to a gently contoured nubbin 65 which is provided with two transversely extending holes 66, 67. The strings 63, 64, are passed through the hole 66 while the hole 67 accommodates another biologically inert string 68 which interconnects the nubbin 65 and inserter-rod 53 where it is passed through a transversely extending hole 69 located in the distal end thereof.

When the gynecologist desires to emplace the intra-uterine insert $B^2$ within a patent's uterus, he must first straighten the involutedly curved tail-portions 59, 60, by either manually pressing them together or by exerting a tensile force on the retention-head 56. Thereupon, the tail-portions 59, 60, are drawn into the tube 50 along with the rest of the retention-head 56 until the same is fully sheathed. The gynecologist fits the loaded insertion tube 50 into the cervical os and advances it slowly through the cervical canal as previously described herein. Once the tube 50 has contacted the fundus and is withdrawn to the proper position, the inserter-rod 53 is advanced therein until the black dot reaches the proximal end of the tube 50, thereby indicating that the retention-head 56 is completely unsheathed within the patient's uterus. Thereafter, the insertion tube 50 is completely withdrawn over the rod 53 and the string 68 is severed with a scissors or cutting forceps and removed along with the inserter-rod 53. In this connection, it should be noted that the strings 63, 64, are of such a length as to permit the nubbin 65 to protrude slightly beyond the cervix. Thus, the patient, at periodic intervals, can examine herself by digital exploration to determine whether or not the intra-uterine insert $B^2$ is properly in place.

Some gynecologists feel that the degree of protection afforded by intra-uterine devices is somewhat dependent on the size of the insert itself, the larger inserts providing greater protection. Insert $B^2$, being somewhat larger than the inserts B and $B^1$ and presenting a greater number of curved members within the uterus, would afford this increased protection if the theory advanced by such gynecologist is correct.

Of course, string 40 of intra-uterine device $A^1$ could be tied to a nubbin as described in conjunction with intra-uterine device $A^2$, and similarly the strings 63, 64, of the intra-uterine device $A^2$ could be tied directly to the inserter-rod 53 as described in conjunction with intra-uterine device $A^1$. The method of connection, of course, is a decision the gynecologist and patient must make. Some prefer a nubbin so that the patient can readily assure herself that the device is correctly in place while others feel that it is not necessary.

Referring now to FIG. 30, it is possible to provide still another modified form of intra-uterine device $A^3$ which is very similar to the intra-uterine device A, except that it is provided with an intra-uterine insert $B^3$ which separates into two pairs of spirally coiled terminal portions. More particularly, the intra-uterine insert $B^3$ is provided with a retention-head 73 which forwardly separates at its one end into two opposed spirally curled terminal portions 74, 75. At its other end, the retention-head 73 again forwardly separates into two additional opposed spirally curled portions 76, 77. The centerlines of the curled portions 74, 75, 76, 77, are all coplanar so as to permit the insert $B^3$ to lie substantially in one plane when fitted within the uterus. When the retention-head 73 is drawn into an insertion tube 78, the spirally curled portions 74, 75, 76, 77, straighten in the formation of a four layer lamination, the transverse thickness of which is somewhat less than the internal diameter of the tube 78. Like the intra-uterine insert $B^2$, the insert $B^3$ presents two additional curled portions within the uterus, which is considered by some gynecologists as an additional safeguard against an unwanted pregnancy.

As will be seen by reference by FIGS. 31 through 34, it is possible to provide the intra-uterine inserts B, $B^1$, $B^2$, $B^3$, with a gently contoured head 80 which is preferably integrally molded to one of the spirally curled terminal portions thereof. The contoured surface of the head 80 is diametrally larger than the outer diameter of the insertion tube so as to extend outwardly beyond the somewhat abrupt distal end margins of the insertion tube. Inwardly from the gently contoured portion, the head 80 is reduced in the provision of cylindrical plug-like portion 81 which is sized to fit snugly but slidably with the insertion tube. Prior to insertion, the intra-uterine insert which carries the gently contoured head 80 is drawn into its insertion tube, causing the spirally curled terminal portions thereof to straighten and come into side-by-side relation. When the head 80 approaches the distal end of the tube, the cylindrical portion 81 thereof is guided into the internal bore of the tube so that the head 80 will project axially beyond the distal end thereof. The cylindrical portion 81, being snugly embraced by the inner walls of the insertion tube, maintains the head 80 in true axial alignment with the tube and prevents the same from bending to one side upon encountering a restriction or as a result of the resilient forces generated by the synthetic resin material itself. Since the gently contoured head 80 is slightly greater in diametral size than the insertion tube, upon advancement through the vagina and cervical canal, it urges the tissues thereof apart and away from the relatively abrupt margins of distal end of the insertion tube. In fact, it is possible for the gynecologist to insert the insertion tube having the head 80 projecting axially from the distal end thereof without previously dilating the cervical canal, thereby relieving the patient of considerable pain and discomfort.

It is also possible to make intra-uterine inserts B, $B^1$, $B^2$, $B^3$, radiopaque so that the same may be readily discernible in situ upon X-ray examination.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An intra-uterine contraceptive assembly comprising an intra-uterine contraceptive device of biologically inert material comprising a trunk portion from which a pair of oppositely disposed loops protrude, an elongated tubular member adapted to linearly receive the device with said loops being unlooped in side-by-side generally linear relation for placement of the device within the uterus, said tubular member being of such size and shape so as to extend at its distal end through the cervical os into the uterus and at its proximal end project entirely outside the body of the patient so as to provide an external portion which can be visualized and manually grasped for purposes of manipulation, and a plunger the leading end of which is joined the trunk portion of the device for to and fro joint manipulation so that when the plunger is slidably disposed within the tubular element but with the trailing end of the plunger projecting from the proximal end thereof pulling of the plunger outward through the proximal end of the tubular member a predetermined distance will load the device into the tubular member through the distal end thereof until the loops are unlooped in the mentioned side-by-side relation and, thereafter pushing the plunger inwardly through the proximal end of the tubular member a predetermined distance will accommodate ejection of the device, when the tubular element is so placed within the uterus, such that the loops, due to the shape-retention characteristics of the inert material, are restored to their looped positions within the frontal plane of the uterine cavity.

2. An assembly as defined in claim 1 wherein the intra-uterine contraceptive device is formed of a flexible synthetic resin.

3. An assembly as defined in claim 1 wherein the trunk portion of the device is severably connected to the plunger by a sleeve.

4. An assembly as defined in claim 1 further comprising a rupturable envelope adapted to accommodate sterilization of the assembly and the interior of the envelope and enclosing and sealed around the entire assembly.

5. An assembly as defined in claim 1 wherein the tubular element is provided with an index mark for gauging the distance the tubular member is to be inserted into the cervical canal and uterus during placement of the device and wherein the plunger is provided with an index mark (a) for gauging the angular position of the device during placement to assure coplanar relation between the uterus cavity and the device and (b) for gauging the displacement necessary to expel the device from the tubular member into the uterus.

6. An assembly as defined in claim 1 further comprising an enlarged bulbous head forming the free end of one said loop, the head being adapted to project axially beyond the distal end of the tubular member when the loops are confined in the tubular member in the unlooped position, the head having a gently contoured outer surface whereby irritation of the walls of the cervical canal and uterus is substantially prevented during placement of the device.

7. An assembly as defined in claim 1 further comprising a non-toxic gelatine cap disposed at the distal end of the tubular member, when the loops are confined within the tubular member in the unlooped position, and gently contoured at its outer surface for guiding the distal end of the tubular member through the cervical canal with a minimum of irritation and discomfort and adapted to be dissolved after placement of the intra-uterine contraceptive device in the uterus.

8. An assembly as defined in claim 1 wherein said loops comprise coplanar spirally curved bifurcated arms.

9. The invention as defined in claim 1 in which the loops comprise two oppositely presented spirally curved terminal portions which extend from the trunk portion, and two oppositely presented involutely curved tail portions which form the trailing portion of the trunk portion.

10. An intra-uterine contraceptive assembly as defined in claim 1 in which the trunk portion of the device and the plunger are connected by string.

11. An assembly as defined in claim 1 wherein said loops are radiopaque.

12. In a method of preparing and placing within the female uterus an intra-uterine contraceptive device having oppositely disposed essentially coplanar free-end loops and a depending trunk portion using a placement unit comprising an elongated tubular member and a plunger, the steps of:

(a) joining the trunk portion of the device to the distal end of the plunger so that the device is manipulated both to and fro by such manipulation of the plunger, (b) slidably disposing the plunger and trunk portion within the tubular member so that the device projects from the distal end of the tubular member and the plunger projects from the proximal end of the tubular member, (c) retaining the placement unit and device in the mentioned assembled position during shipment and storage, (d) thereafter grasping the proximal end of the placement unit only, (e) pulling the plunger outward through the proximal end of the tubular member to load the placement unit by concurrently pulling the device solely by reason of the displacement of the plunger into the tubular member through the distal end thereof, the loops being unlooped in side-by-side generally linear relation, (f) inserting the distal end of the loaded tubular member into the cervical os, (g) advancing the loaded tubular member into the uterus, (h) jointly angularly orienting the tubular member and the plunger so that the device will be ejected from the tubular member in coplanar relation with the frontal plane of the uterine cavity, (i) advancing the plunger through the proximal end of the tubular member thereby ejecting the device from the tubular member and accommodating re-looping of the loops within the frontal plane of the uterus cavity, (j) withdrawing the tubular member relative to the plunger a distance sufficient to expose the device at the vagina, (k) disjointing the plunger from the device, and (l) withdrawing the tubular member and the plunger from the vagina of the patient.

13. A method as defined in claim 12 wherein step (g) comprises advancing the loaded tubular member into the uterus until an index mark on the tubular member is disposed near the cervical os, to assure proper placement of the device.

14. A method as defined in claim 12 wherein step (h) comprises angularly orienting the tubular member and plunger by means of an index mark on the plunger, to assure proper placement of the device.

15. A method as defined in claim 12 wherein step (i) comprises ejecting the loops of the device into re-looped relation within the frontal plane of the uterine cavity by advancing the plunger relative to the tubular member until an index mark on the plunger is approximately disposed at the proximal end of the tubular member, to assure proper placement of the device.

16. A method as defined in claim 12 wherein step (k) is preceded by laterally displacing the tubular member and the plunger jointly to one side of the cervical os within the vagina.

17. In a method of placing within the female uterus an intra-uterine contraceptive device, having oppositely disposed essentially coplanar free-end loops joined at trunk portion, using an elongated tubular member and a plunger, the steps of: attaching the trunk portion of the device to the distal end of the plunger to accommodate both to and fro displacement of the device responsive to manipulation of the plunger, slidably disposing the plunger within the tubular member so that the plunger projects from the proximal end of the tubular member, sterilizing the intra-uterine contraceptive assembly, pulling the plunger in an outward direction through the proximal end of the tubular member to thereby pull the device into the tubular member through the distal end thereof thereby preserving the sterileness of the device while unlooping the loops within the tubular member in side-by-side generally linear relation, inserting the distal end of the loaded tubular member into the cervical os, displacing the loaded tubular member relative to the uterus until the distal end of the tubular member is immediately adjacent the fundus, jointly rotationally orienting the tubular member and the plunger so that the device will be ejected from the tubular member in essentially coplanar relation with the frontal plane of the uterine cavity, advancing the plunger into the tubular member through the proximal end thereof thereby ejecting the device from the distal end of the tubular member and accommodating re-looping of the loops within the frontal plane of the uterine cavity, separating the plunger from the trunk of the device, and withdrawing the tubular member and plunger from the vagina of the patient.

18. In a method of assembling, loading and placing within the female uterus an intra-uterine contraceptive device having oppositely disposed essentially coplanar free-end loops and a depending stem using a placement unit comprising an elongated tubular member and a plunger, the steps of:

assembling the device and placement unit by (a) attaching the stem of the device to the distal end of the plunger to accommodate joint to and fro manipulation, (b) slidably disposing the plunger and the stem within the tubular member so that the device projects from the distal end of the tubular member and the plunger projects from the proximal end of the tubular member, (c) packaging the placement unit and device in the mentioned assembled position with the loops disposed in the looped position external of the tubular member, (d) sterilizing the package for storage prior to use;

thereafter, loading the device within the placement unit by (f) removing the package, (g) pulling the plunger outward through the proximal end of the tubular member to concurrently pull the device into the tubular member through the distal end thereof to preserve the sterileness of the device and at the same time unlooping the loops in side-by-side generally linear relation, and thereafter, placing the device within the uterus of a patient by (h) inserting the distal end of the loaded tubular member into the cervical os (i) advancing the loaded tubular member into the uterus, (j) orienting the placement unit so that the device will be ejected from the tubular member in coplanar relation with the frontal plane of the uterine cavity, (k) advancing the plunger progressively through the proximal end of the tubular member thereby ejecting the device from the tubular member and accommodating re-looping of the loops within the frontal plane of the uterine cavity, (l) withdrawing the tubular member relative to the plunger to expose the device at the vagina, (m) detaching the plunger from the device and (n) withdrawing the tubular member and plunger from the vagina of the patient.

19. A method as defined in claim 18 wherein step (m) comprises severing the device at a location spaced from its attachment to the distal end of the plunger.

20. An intra-uterine contraceptive device formed of resilient, biologically inert material and comprising at least one elongated segment adapted to be disposed adjacent the cervical canal, and at least two substantially coplanar oppositely disposed resilient loops each terminating in at least one free end and each being joined to the elongated segment, said loops being adapted to be placed in coplanar relation within the uterus cavity so the loops resiliently rest respectively upon the opposed lateral walls of the uterus to thereby readily yield to uterine contractions to avoid chafing, irritation and inflammation of the uterus wall while substantially obviating involuntary expulsion of the device, the improvement comprising an enlarged bulbous head comprising the free end of one said loop the intermediate portion of which has a maximum lateral dimension on the order of several times greater than the maximum lateral dimension of the adjacent loop, the head being reduced in lateral dimension from the intermediate portion toward both the rear and the front, respectively, and having a gently contoured outer front surface to accommodate relatively easy placement of the device in the uterus.

21. In a method of correctly and comparatively painless placing a circuitously shaped intra-uterine contraceptive device (IUCD) within the uterine cavity without need of dilation, comprising: disposing the IUCD in generally linear relation within the hollow bore of a tubular IUCD inserter, generally concealing the distal edge of the tubular inserter by locating a tapered enlarged head comprising one free end of the IUCD and providing a rounded leading vertex immediately forward of and laterally beyond the maximum inside dimension of the inserter, retaining the head generally in the concealing location while advancing the head followed by the distal end of the inserter with the distal edge thereof generally concealed by the enlarged head end of the inserter through the cervix of a female human being for ejection and placement of the IUCD within the uterine cavity.

22. In a method of correctly placing a circuitously shaped intra-uterine contraceptive device (IUCD) within the uterine cavity without need of dilation, comprising:

joining one free end of the (IUCD) to the distal end of a plunger comprising part of a placement unit so that the (IUCD) can be manipulated both to and fro by manipulation of the plunger, slidably disposing the plunger and the one free end of the (IUCD) within a tubular inserter also comprising part of the placement unit so that part of the (IUCD) projects from the distal end of the tubular inserter and part of the plunger projects from the proximal end of the tubular inserter, grasping the proximal end of the plunger and pulling the plunger outwardly through the proximal end of the tubular inserter and thereby pulling the (IUCD) into the tubular inserter through the distal end thereof to load the placement unit by disposing the (IUCD) in generally linear relation within the tubular inserter, retaining the (IUCD) and the placement unit in the mentioned loaded condition while advancing the (IUCD) and placement unit, distal end first, through the cervix of a female human being for ejection and placement of the (IUCD) within the uterine cavity.

References Cited

UNITED STATES PATENTS

| | | | |
|---|---|---|---|
| 3,200,815 | 8/1965 | Margulies | 128—130 |
| 3,234,938 | 2/1966 | Robinson | 128—130 |
| 3,250,271 | 5/1966 | Lippes | 128—130 |
| 3,291,125 | 12/1966 | Robinson | 128—130 |

ADELE M. EAGER, *Primary Examiner.*

UNITED STATES PATENT OFFICE
CERTIFICATE OF CORRECTION

Patent No. 3,374,788 March 26, 1968

Gerald S. Rosenthal

It is hereby certified that error appears in the above numbered patent requiring correction and that the said Letters Patent should read as corrected below.

Column 7, line 6, "retentionhead" should read -- retention-head --. Column 8, line 72, "joined the trunk" should read -- joined to the trunk --. Column 9, line 1, "pulling of the plunger" should read -- pulling the plunger --. Column 11, lines 26 and 27, cancel "(d) sterilizing the package for storage prior to use;" and insert -- (d) sterilizing the assembly and the interior of the package, (e) sealing the package for storage prior to use; --. Column 12, lines 26 and 27, "head end of the inserter through" should read -- head through --; lines 33, 35,38, 45, 48, 50, 52 and 54, "(IUCD)" , each occurrence, should read -- IUCD --.

Signed and sealed this 29th day of July 1969.

(SEAL)
Attest:

EDWARD M.FLETCHER,JR.
Attesting Officer

WILLIAM E. SCHUYLER,JR.
Commissioner of Patents